United States Patent
Hee et al.

(10) Patent No.: US 10,036,870 B2
(45) Date of Patent: Jul. 31, 2018

(54) LENS ACTUATOR

(71) Applicants: Sul Hyun Hee, Shenzhen (CN); Yang Dea Yue, Shenzhen (CN); Kim Young Jin, Shenzhen (CN)

(72) Inventors: Sul Hyun Hee, Shenzhen (CN); Yang Dea Yue, Shenzhen (CN); Kim Young Jin, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 395 days.

(21) Appl. No.: 14/832,566

(22) Filed: Aug. 21, 2015

(65) Prior Publication Data

US 2016/0209671 A1 Jul. 21, 2016

(30) Foreign Application Priority Data

Jan. 19, 2015 (KR) .................. 10-2015-0008494

(51) Int. Cl.
*G02B 7/10* (2006.01)
*G02B 27/64* (2006.01)
*G02B 7/09* (2006.01)
*G02B 7/08* (2006.01)
*G02B 7/02* (2006.01)

(52) U.S. Cl.
CPC ................. *G02B 7/10* (2013.01); *G02B 7/08* (2013.01); *G02B 7/09* (2013.01); *G02B 27/646* (2013.01); *G02B 7/026* (2013.01)

(58) Field of Classification Search
None
See application file for complete search history.

(56) References Cited

U.S. PATENT DOCUMENTS

| 2013/0215511 A1* | 8/2013 | Wu ...................... G02B 27/646 |
| | | 359/554 |
| 2014/0009631 A1* | 1/2014 | Topliss ................. G02B 27/646 |
| | | 348/208.11 |

* cited by examiner

*Primary Examiner* — Darryl J Collins
*Assistant Examiner* — Journey Sumlar
(74) *Attorney, Agent, or Firm* — Na Xu; IPro, PLLC

(57) ABSTRACT

A lens actuator includes a housing; a movable unit received in the housing and including: a carrier, a focusing coil disposed in the carrier, four magnets disposed to face the focusing coil in four directions perpendicular to the optical axis direction, a holder fixing the magnets; four shake correction coils each disposed opposite to one magnet and fixed on the housing; a first elastic element including a pair of spring plates arranged centrally symmetrical, each spring plate including a first spring part connecting the carrier to the holder, a second spring part connecting the holder to the housing and a third spring part connected between the first and second spring parts.

8 Claims, 5 Drawing Sheets

LENS ACTUATOR

FIELD OF THE INVENTION

The present disclosure generally relates to the art of driving apparatus, and more particularly to a lens actuator with optical image-stabilization (OIS) function.

DESCRIPTION OF RELATED ARTS

With the development of camera technologies, lens actuators are widely used in various digital devices equipped with cameras, like cell phones, video cameras, laptop computers and so on.

A lens actuator used in a digital device usually includes a lens holder, a lens disposed in the lens holder, a coil wound around the lens holder and a stationary magnet separated from the coil and interacted with the coil for generating an electromagnetic force for driving the coil together with the lens to move approaching or away along an optical axis. However, in order to operate the lens actuator, an element, such as a suspension wire, a wire spring, or the like, is needed for conducting a current from outside into the coil. Such element also can be used for suppressing the shake of the lens actuator. Since such element is provided in the lens actuator, it is difficult for users to assemble such lens actuator, which would result in a reduction of production efficiency.

Therefore, an improved lens actuator is provided in the present disclosure to solve the problem mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
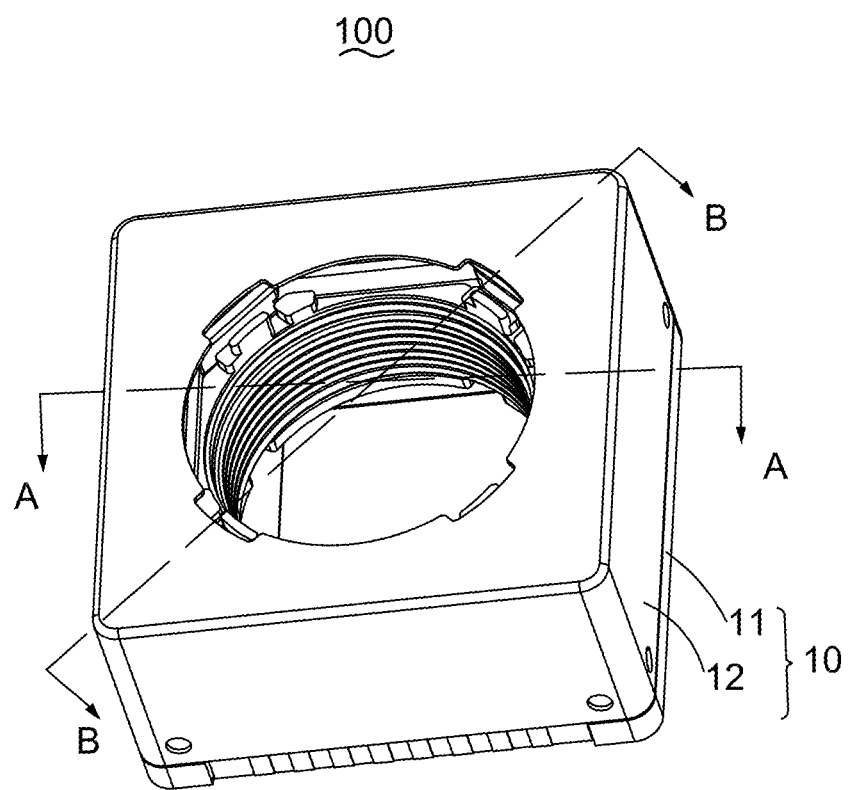
FIG. 1 is an illustrative isometric view of a lens actuator according to an exemplary embodiment of the present disclosure.
Figure 2:
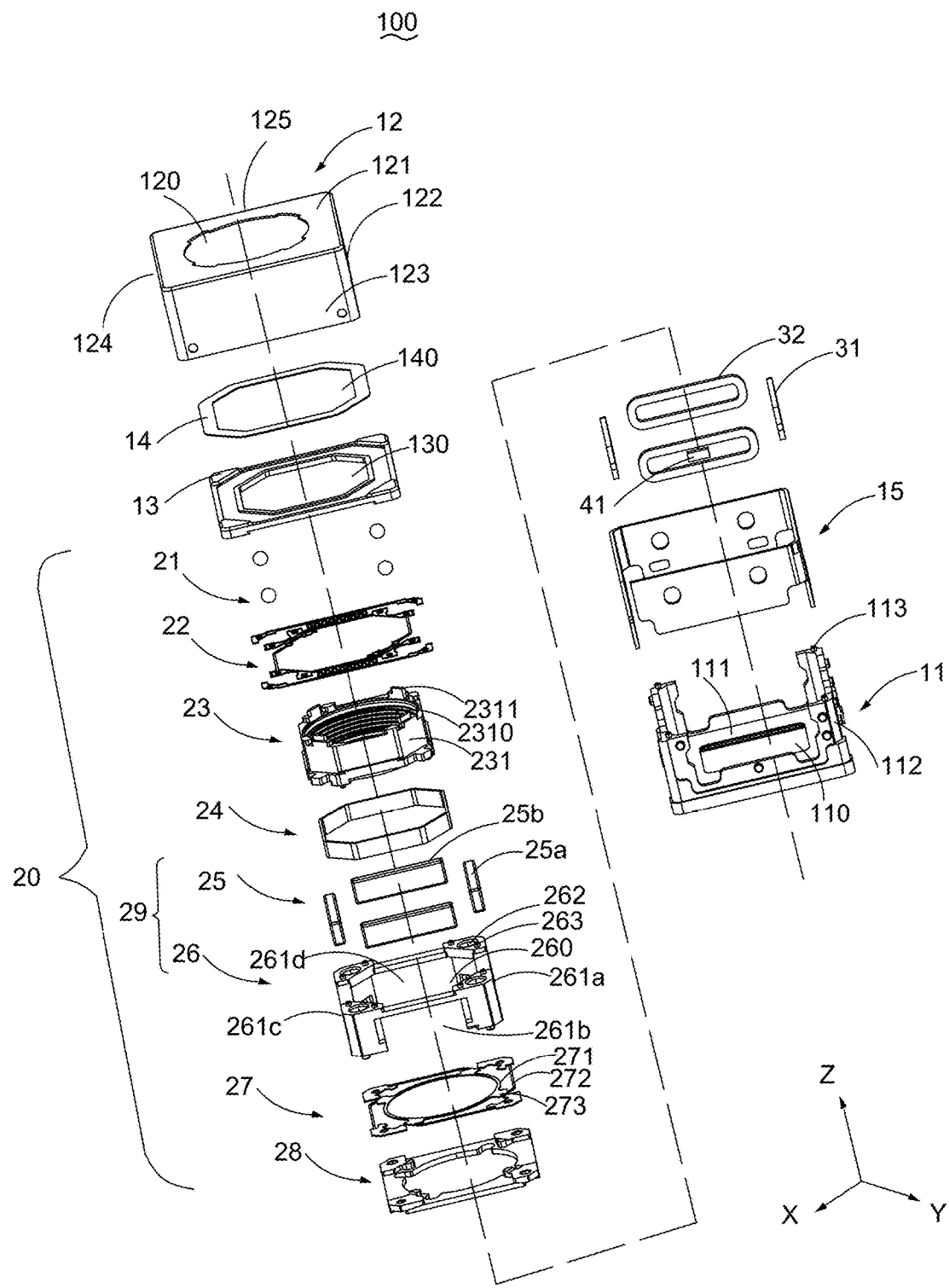
FIG. 2 is an exploded view of the lens actuator in FIG. 1.
Figure 3:
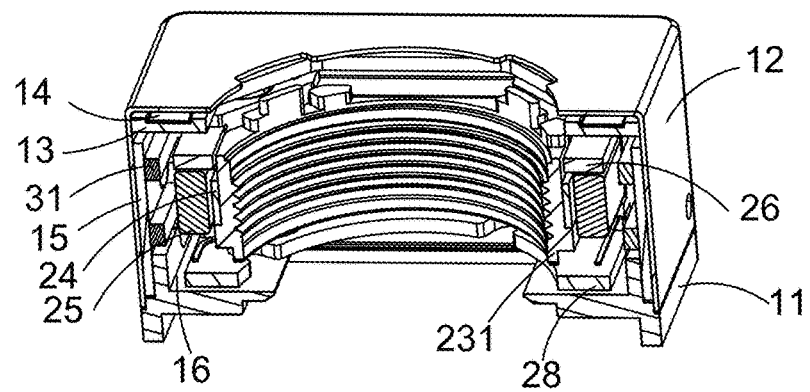
FIG. 3 is a cross-sectional view of the lens actuator taken along line A-A of FIG. 1.
Figure 4:
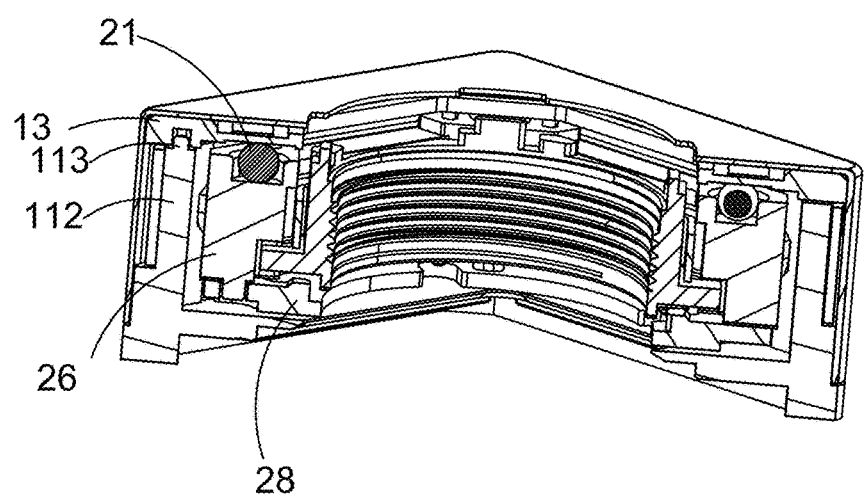
FIG. 4 is a cross-sectional view of the lens actuator taken along line B-B of FIG. 1.

While the invention is susceptible of embodiments in many different forms, there is shown in the drawings and will herein be described in detail embodiment of the invention with the understanding that the present disclosure is to be considered as an exemplification of the principles of the invention and is not intended to limit the broad aspect of the invention to the embodiment illustrated.

Referring to FIGS. 1-4, a lens actuator 100 according to the exemplary embodiment of the present disclosure is mounted to a mobile terminal such as a camera-equipped cellular mobile phone which is enable automatic focusing (AF), a smart phone, a notebook personal computer, a tablet-type personal computer, a mobile-type game machine, a Web camera, a vehicle-mounted camera, or the like.

The lens actuator 100 includes a housing 10 having a base 11, a cover 12 assembled with the base 11 for forming a receiving space 16, a movable unit 20 received in the receiving space 16 and movably mounted on the base 11. The movable unit 20 defines an optical axis Z.

The cover 12 has a rectangular box shape with a first hole 120 formed in the center thereof. The cover 12 includes a top wall 12 1and four sidewalls 122-125 extending downward from edges of the top wall 121. The housing 10 further comprises a flexible print circuit board (FPCB) 15 having a rectangular box shape that includes both ends opening. The FPCB 15 is connected to the four sidewalls 122-125 via gluing, soldering, and so on. The cover 12 is made of nonmagnetic material, such as aluminum and nickel-silver alloy.

A coordinate system (X, Y, Z) is defined. The optical axis is referred as Z axis, and an upper direction of the optical axis is hereafter referred as a forward direction +Z (+Z side). When viewed from the +Z side, the four sidewalls of the cover 12 are denoted respectively by 122, 123,124,125 in a clockwise direction. The direction from the sidewall 122 toward the sidewall 124 is designated as a forward direction of the X axis (+X side); the direction from the sidewall 125 toward the sidewall 123 is designated as a forward direction of the Y axis (+Y side). The X axis and Y axis are orthogonal to the optical axis (Z axis) and perpendicular to each other.

The base 11 includes base board 111 having a rectangular shape with a second hole 110 formed in the center thereof and four limbs 112 each protruding upward from one corner of the base board 111. Each limb 112 comprises a first location column 113 extending upward from a top surface of the limb 112.

Figure 5:
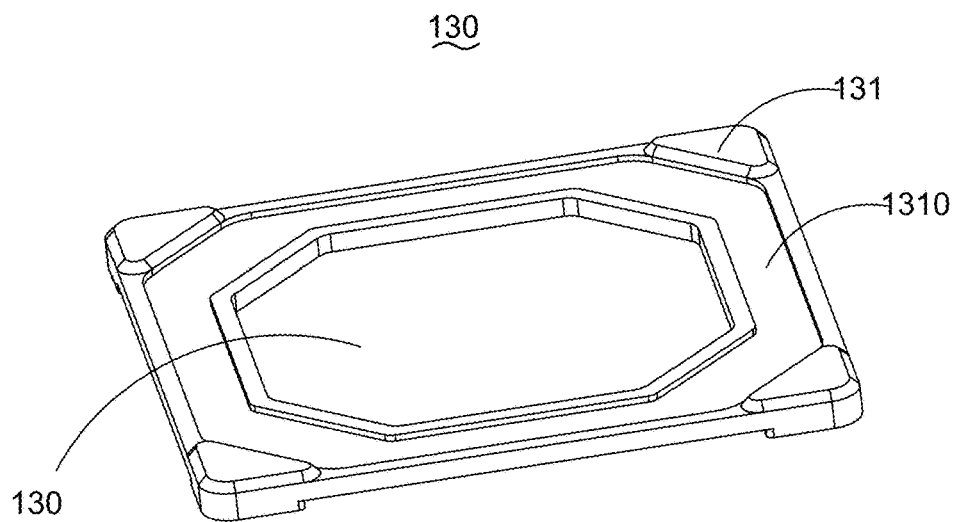
FIG. 5 is an illustrative isometric view of a spacer of the lens actuator in FIG. 2.
Figure 6:
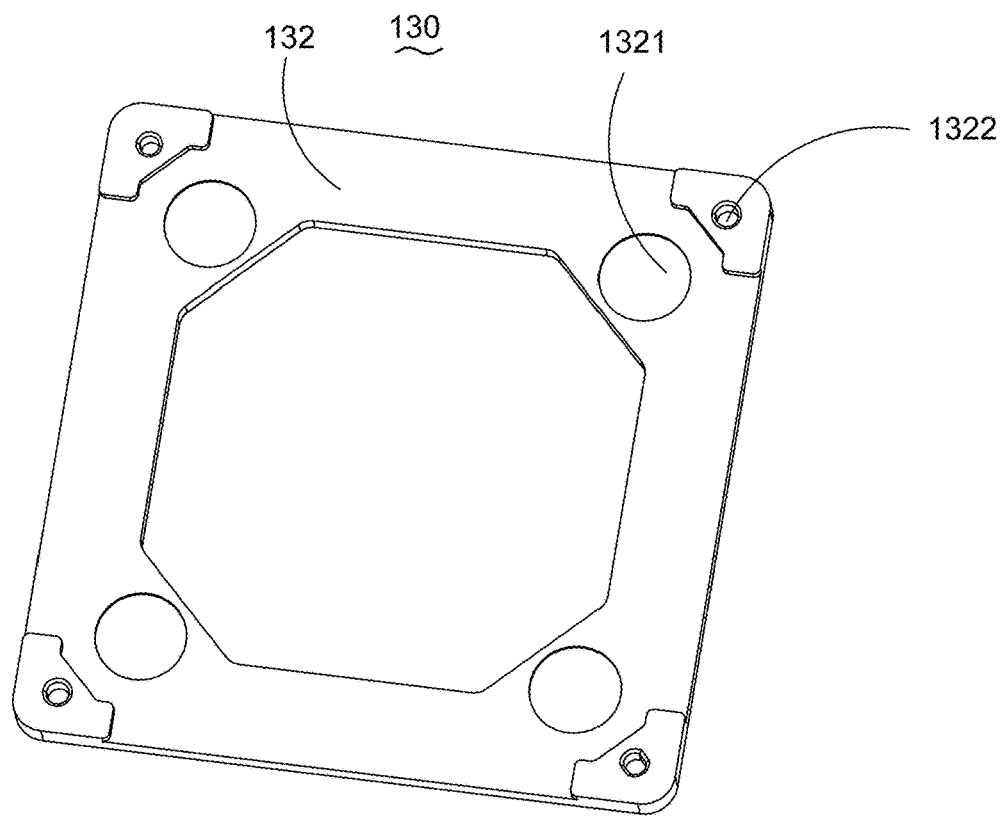
FIG. 6 is also an illustrative isometric view of the spacer, but from another aspect.

As shown in FIGS. 5-6, the housing 10 further comprises a spacer 13 disposed between the movable unit 20 and the top wall 121 of the cover 12. The spacer 13 takes a rectangular plate shape with a first octagonal hole 130 formed in the center thereof. The spacer 13 includes a lower surface 132 away from the top wall 121 and an upper surface 131 opposite to the lower surface 132. A ring groove 1310 is formed on the upper surface 131 and surrounding the first octagonal hole 130. Four bind holes 1322 are formed on the lower surface 132 and located on the four corners of the spacer 13. Four first accommodating grooves 1321 are formed on the lower surface 132 and each is adjacent to one blind hole 1322. Each first accommodating groove 1321 has a round shape. Each blind hole 1322 is configured for receiving the first location column 113 of the base 11 for fixing on the base 11.

The movable unit 20 is disposed between the spacer 13 and the base board 111 of the base 11. The movable unit 20 comprises a magnet assembly 29, a first elastic element 22, a second elastic element 27 and a lens assembly 23 suspended in the magnet assembly 29 by the first and second elastic elements 22,27.

Lens assembly 23 includes a carrier 231 and a focusing coil 24 disposed on an outer circumference of the carrier 231 and wound around the optical axis Z. The carrier 231 made of an insulating resin, such as polycarbonate containing glass, has an octagonal box shape that includes a third hole 2310 in the center. A screw thread may be included inside third hole 2310 for fixing the lens (not shown) to the carrier 231. A plurality of projections 2311 protrude upward from a top surface of the carrier 231 and are spaced with each other.

Magnet assembly 29 includes a holder 26, a pair of first magnets 25a and a pair of second magnets 25b. Holder 26 made of an insulating resin, such as polycarbonate containing glass, has a rectangular box shape that includes a rectangular hole 260 in the center. The holder 26 has a first receiving groove 261a, a second receiving groove 261b, a third receiving groove 261c, and a fourth receiving groove 261d, which are formed on four sidewalls thereof respectively for receiving the magnets 25. The first and third receiving grooves 261a, 261c are arranged on the +X side portion and the −X side portion of sidewalls of the holder 26. The second and fourth receiving grooves 261b, 261d are arranged on the +Y side portion and the −Y side portion of sidewalls of the holder 26. The first and second magnets 25a, 25b take a rectangular solid shape. The first magnets 25a are received in the first and third receiving grooves 261a, 261c, respectively. The second magnets 25b are received in the second and fourth receiving grooves 261b, 261d, respectively. Each of the four magnets 25 includes an inner surface facing the focusing coil 24 for interacting with the focusing coil 24 to generate electromagnetic force to move the lens assembly 23 in the optical axis direction Z relative to the magnet assembly 29 and an outer surface opposite to the inner surface. Holder 26 further includes four second accommodating grooves 262 formed on four corners of the top surface of the holder 26. In each corner of the holder 26, there are two second location columns 263 provided on both sides of the second accommodating grooves 262.

The second elastic element 27 is a conductive-metal plate spring, which includes an outer peripheral portion 272 connected with the holder 26, an inner periphery portion 271 connected with the carrier 231 and a plurality of meandering springs 273 connected between the inner periphery portion 271 and the outer periphery portion 2722.

Figure 7:
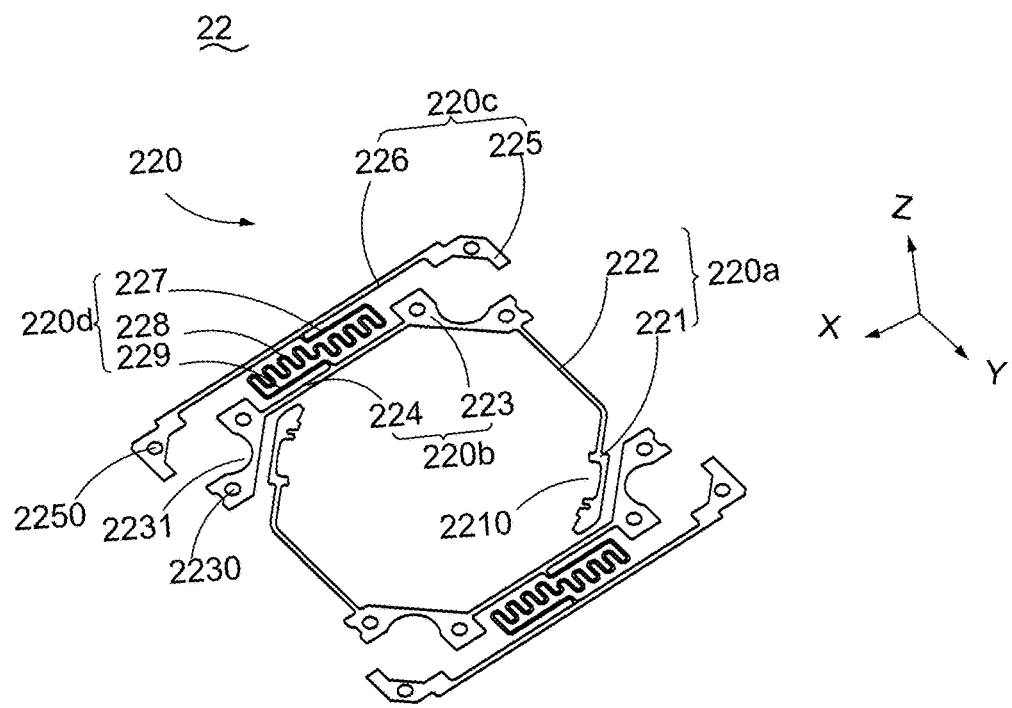
FIG. 7 is an illustrative isometric view of a first elastic element of the lens actuator in FIG. 2.
Figure 8:
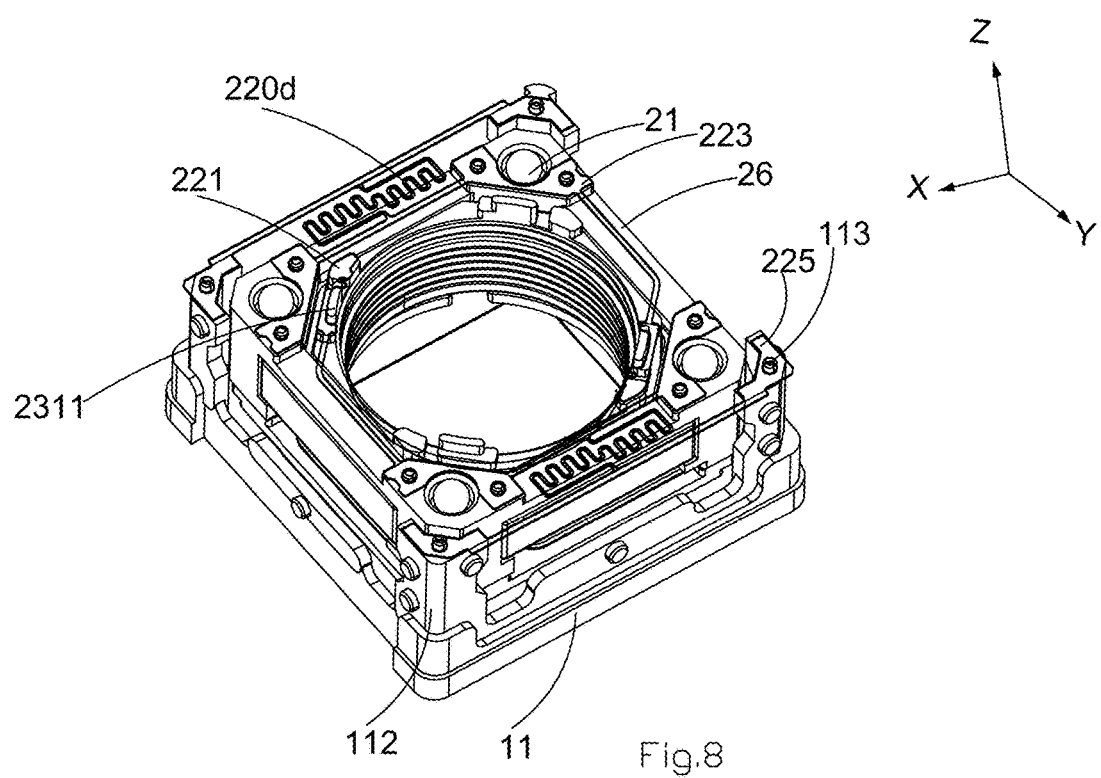
FIG. 8 is an assemble view of an assembly of a movable unit and a base of the lens actuator in FIG. 2.

As shown in FIG. 7-8, the first elastic element 22 is a conductive-metal plate spring, which includes a pair of spring plates 220 arranged centrally symmetrical. Each spring plate 220 includes a first spring part 220a,220b connected the carrier 231 to the holder 26, a second spring part 220c connected the holder 26 to the housing 10, and a third spring part 220d connected between the first spring part 220a,220b and the second spring part 31c. The first spring part includes a first connecting section 220a connected to the carrier 231 and a second connecting section 220b connected to the holder 26.

The first connecting section 220a includes a first connecting plate 221 including an engaging recess 2210 shaped to match the projection 2311 of the carrier 231 for engaging with the carrier 231, and a first connecting beam 222 connected between the first connecting plate 221 and the second connecting section 220b.

The second connecting section 220b includes a pair of second connecting plates 223 and a second connecting beam 224 connected between the second connecting plates 223. Optionally, the second connecting plates 223 are arranged symmetrically about the Y axis. Each second connecting plate 223 defines two first through holes 2230 for receiving the second location columns 263 of the holder 26. With such configuration, the second connecting section 220b is fixed on the holder 26. A slot 2231 is formed on each second connecting plate 223 at a position corresponding to the second accommodating grooves 262.

The second spring part 220c includes a pair of third connecting plates 225 and a third connecting beam 226 connected between the third connecting plates 225. Optionally, the third connecting plates 225 are arranged symmetrically about the Y axis. Each third connecting plate 225 defines a second through hole 2250 for receiving the first location column 113 of the base 11. With such configuration, the second spring part 220c is fixed on the base 11. Optionally, the second connecting beam 224 is parallel to the third connecting beam 226, and the first connecting beam 222 is substantially perpendicular to the second connecting beam 224.

The third spring part 220d includes a serpentine spring section 228 extending in a direction parallel to a length direction of the second connecting beam 224, a first line spring section 229 parallel to a length direction of the second connecting beam 224 and connected one end of the serpentine spring section 228 to the second connecting beam 224, and a second line spring section 227 parallel to a length direction of the third connecting beam 226 and connected another end of the serpentine spring section 228 to the third connecting beam 226.

With such configuration of the first elastic element, the second spring part 220c is electrically connected to the FPCB 15; and the first connecting section 220a is electrically connected to the focusing coil 24. Thus, the current from the FPCB 15 can be conducted into the focusing coil 24 by the first elastic element 22. Therefore, there is no need for suspension wires in this embodiment. The movable unit 20 of the lens actuator 100 can be assembled by laminating the carrier 231, holder 26 and the first elastic element 22 in top-down direction, which can improve the production efficiency of the lens actuator 100.

The movable unit 20 further comprises a stopper plate 28 disposed below the second elastic element 27 and fixed on the holder 26 for restraining the movement of the carrier 231 in the optical axis direction.

The lens actuator 100 further includes a pair of first shake correction coils 31 each disposed opposite to the first magnet 25a in the X axis direction and fixed on the FPCB 15 and a pair of second shake correction coils 32 each disposed opposite to the second magnet 25b in the Y axis direction.

The lens actuator 100 further includes two shake detection elements 40 disposed in the centers of the first and second shake correction coils 31, 32 respectively for detecting a position in the X axis direction of the movable unit 20 and a position in the Y axis direction of the movable unit 20 respectively.

The lens actuator 100 further includes a plurality of bearing balls 21 disposed between the movable unit 20 and the spacer 13 for reducing friction between the movable unit 20 and the base 11 while moving. Optionally, four bearing balls 21 are provided in this embodiment. It is obviously for the one skilled in the art that the number of the bearing balls is not limited to this, and it is variable according to the actual requirement. In this embodiment, a lower end of each bearing ball 21 is received in one second accommodating groove 262, and an upper end of such bearing ball 21 is received in corresponding first accommodating groove 1321 via passing through the slot 2231 of the first elastic element 22. A diameter of the first accommodating groove 1321 is greater than that of the bearing ball 21. A depth of the first accommodating groove 1321 in the optical axis direction is less than that of the second accommodating groove 262.

The lens actuator 100 further includes a magnetic conductive plate 14 attached on the upper surface 131 of the spacer 13. Specifically, the magnetic conductive plate 14 is received in the ring groove 1310 and fixed on the spacer 13 by glue, soldering, and so on. The magnetic conductive plate 14 has an octagonal plate shape that includes a second octagonal hole 140 in the center. With the construction of the magnetic conductive plate 14, the spacer 13 can be in close contact with the bearing balls 21 due to magnetic force generated between the magnetic conductive plate 12 and the magnets 25. The first hole 120, the first octagonal hole 130, the second octagonal hole 140, the third hole 2310 and the second hole 110 are continuously made to form a through-hole from the upper surface to the lower surface of the lens actuator 100.

When the focusing coil 24 is electrified, an electromagnetic force is generated by the focusing coil interacted with the magnets to move the carrier in the optical axis direction Z. when the shake correction coils 31, 32 are electrified, an electromagnetic force generated between the shake correction coils and the magnets drives the movable unit 20 moving in the X axis direction and the Y axis direction from a default position. When the movable unit 20 moves away from the default position, the second spring part 220c moves along with the movable unit 20. Thus, the third spring part 220d would present elastic deformation and provides elastic force to the movable unit 20. The movable unit 20 would be stopped by a balance among a space applied to the bearing balls 21, the electromagnetic force and the elastic force. When the electrified is stopped, the third spring part 220d returns to its original shape and make the movable unit 20 return back to the default position.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A lens actuator, comprising:
a housing including a receiving space;
a movable unit received in the receiving space and comprising,
a carrier defining an optical axis,
a focusing coil disposed in the carrier and wound around the optical axis,
a pair of first magnets each opposite to the focusing coils in a first axis direction perpendicular to the optical axis direction,
a pair of second magnets each opposite to the focusing coils in a second axis direction perpendicular to the optical axis direction,
a holder fixing the first and second magnets;
a pair of first shake correction coils each disposed opposite to the first magnet in the first axis direction and fixed on the housing;
a pair of second shake correction coils each disposed opposite to the second magnet in the second axis direction and fixed on the housing;
a first elastic element including a pair of spring plates arranged centrally symmetrical, each spring plate including a first spring part connecting the carrier to the holder, a second spring part connecting the holder to the housing and a third spring part connected between the first and second spring parts; wherein,
the first spring part includes a first connecting section connected to the carrier and a second connecting section connected to the holder;
the first connecting section includes a first connecting plate engaging with a projection of the carrier and a first connecting beam connected the first connecting plate to the second connecting section;
the second connecting section includes a pair of second connecting plates each connected with the holder and a second connecting beam connected between the pair of second connecting plates, one of the second connecting plates connected with the first connecting beam;
the second spring part includes a pair of third connecting plates each connected with the housing and a third connecting beam connected between the third connecting plates;
the third spring part includes a serpentine spring section extending in a direction parallel to a length direction of the second connecting beam and connected between the second connecting beam and the third connecting beam;
and the third spring part further includes a first line spring section parallel to the second connecting beam and connected between one end of the serpentine spring section and the second connecting beam, and a second line spring section parallel to the third connecting beam and connected between another end of the serpentine spring section and the third connecting beam.

2. The lens actuator of claim 1, wherein the housing includes a base, a cover including a top wall and a plurality of sidewalls extending downward from the top wall, and a spacer disposed between the movable unit and the top wall and fixed on the base.

3. The lens actuator of claim 2 further comprises a plurality of bearing balls disposed between the spacer and the holder for making the movable unit move smoothly in the housing.

4. The lens actuator of claim 3, wherein the spacer defines a plurality of first accommodating grooves for receiving upper ends of the bearing balls, a plurality of second accommodating grooves formed on the holder for receiving lower ends of the bearing balls, wherein, a diameter of the first accommodating groove is greater than that of the bearing ball.

5. The lens actuator of claim 3 further comprises a magnetic conductive plate attached on an upper surface of the spacer for generating a magnetic force together with the magnets to make the spacer be in close contact with the bearing balls.

6. The lens actuator of claim 1, wherein the first axis is perpendicular to the second axis.

7. A lens actuator, comprising,
a base;
a cover assembled with the base for forming a receiving space;
a holder movably mounted on the base;
a carrier defining an optical axis and suspended in the holder,
a focusing coil disposed in the carrier and wound around the optical axis,
four magnets fixed on the holder and disposed to face the focusing coil in four directions perpendicular to the optical axis direction for generating electromagnetic force together with the focusing coil to move the carrier in the optical axis direction;
four shake correction coils each disposed opposite to one magnet and fixed on the housing for generating electromagnetic force together with the magnets to move the movable unit in a direction perpendicular to the optical axis;
an upper spring including a pair of spring plates arranged centrally symmetrical, each spring plate including a first spring part connecting the carrier to the holder, a second spring part connecting the holder to the base and a shake correction spring connected between the first and second spring parts;

the first spring part includes a first connecting section connected to the carrier and a second connecting section connected to the holder;

the first connecting section includes a first connecting plate engaging with a projection of the carrier and a first connecting beam connected the first connecting plate to the second connecting section;

the second connecting section includes a pair of second connecting plates each connected with the holder and a second connecting beam connected between the pair of second connecting plates, one of the second connecting plates connected with the first connecting beam;

the second spring part includes a pair of third connecting plates each connected with the base and a third connecting beam connected between the third connecting plates;

the shake correction spring is a serpentine spring section extending in a direction parallel to a length direction of the second connecting beam and connected between the second connecting beam and the third connecting beam;

and the shake correction spring further includes a first line spring section parallel to the second connecting beam and connected between one end of the serpentine spring section and the second connecting beam, and a second line spring section parallel to the third connecting beam and connected between another end of the serpentine spring section and the third connecting beam.

8. The lens actuator of claim 7, wherein the second connecting beam is parallel to the third connecting beam.

* * * * *